US009412539B2

(12) United States Patent
Wan

(10) Patent No.: US 9,412,539 B2
(45) Date of Patent: Aug. 9, 2016

(54) FRAME-SUPPORTED CIRCUIT BREAKER HAVING AUTOMATIC LOCKING FUNCTION

(75) Inventor: Jiasheng Wan, Wuhan (CN)

(73) Assignee: HUBEI SHENGJIA WIRING CO., LTD., Wuhan, Hubei (CN)

( * ) Notice: Subject to any disclaimer, the term of this patent is extended or adjusted under 35 U.S.C. 154(b) by 437 days.

(21) Appl. No.: 13/982,709

(22) PCT Filed: Jan. 18, 2012

(86) PCT No.: PCT/CN2012/000093
§ 371 (c)(1), (2), (4) Date: Oct. 14, 2013

(87) PCT Pub. No.: WO2012/100652
PCT Pub. Date: Aug. 2, 2012

(65) Prior Publication Data

US 2014/0374223 A1 Dec. 25, 2014

(30) Foreign Application Priority Data

Jan. 30, 2011 (CN) .......................... 2011 1 0036976

(51) Int. Cl.

| | |
|---|---|
| ***G05B 19/00*** | (2006.01) |
| ***H01H 31/04*** | (2006.01) |
| ***H01H 9/22*** | (2006.01) |
| ***H01H 9/02*** | (2006.01) |
| ***H01H 9/54*** | (2006.01) |
| ***H01H 27/10*** | (2006.01) |
| *H01H 71/00* | (2006.01) |

(52) U.S. Cl.
CPC ............. *H01H 31/04* (2013.01); *H01H 9/0271* (2013.01); *H01H 9/223* (2013.01); *H01H 9/54* (2013.01); *H01H 27/10* (2013.01); *H01H 2071/006* (2013.01); *H01H 2231/032* (2013.01); *H01H 2235/01* (2013.01); *H01H 2235/012* (2013.01)

(58) Field of Classification Search
CPC ......... G06F 21/35; G06F 21/32; G06F 21/31; G06F 21/88; B60R 25/04; H01H 27/10
USPC ........ 340/5.74, 5.7–5.8; 200/43.12, 337, 400, 200/401
See application file for complete search history.

(56) References Cited

U.S. PATENT DOCUMENTS

| | | | | |
|---|---|---|---|---|
| 6,703,938 B1 * | 3/2004 | Clarke | ................. | G01R 19/155 340/638 |
| 6,734,379 B1 * | 5/2004 | Savadian | ................... | B25F 5/00 200/41 |
| 2011/0053557 A1 * | 3/2011 | Despain | ................. | A47G 29/10 455/410 |

* cited by examiner

*Primary Examiner* — George Bugg
*Assistant Examiner* — Sharmin Akhter

(57) ABSTRACT

An air circuit breaker with a self-locking function, includes: an air circuit breaker body; wherein the air circuit breaker further includes an input unit for inputting a locking code or an unlocking code; an authentication processing unit for receiving the locking code or the unlocking code from the input unit and outputting a control signal after authenticating; and a locking unit for receiving the control signal from the authentication processing unit and locking or unlocking the air circuit breaker body.

19 Claims, 16 Drawing Sheets

FRAME-SUPPORTED CIRCUIT BREAKER HAVING AUTOMATIC LOCKING FUNCTION

CROSS REFERENCE OF RELATED APPLICATION

This is a U.S. National Stage under 35 U.S.C 371 of the International Application PCT/CN2012/000093, filed Jan. 18, 2012, which claims priority under 35 U.S.C. 119(a-d) to CN 201110036976.0, filed Jan. 30, 2011.

BACKGROUND OF THE PRESENT INVENTION

1. Field of Invention

The present invention relates to a circuit breaker, and more particularly to an air circuit breaker with a self-locking function after manually setting a breaking code.

2. Description of Related Arts

Circuit breaker is a very important electrical equipment and is widely applied on electricity management field. However, circuit breaker has disadvantages as follows.

In terms of the functions of the conventional circuit breakers, if maintenance workers haven't finished maintenance after cutting the power, and the circuit breaker is closed at this time, not only the power grid will break down, but also the lives of the works will be threatened. At present, two measures have been taken by power stations. The first one is opening the circuit breaker before the maintenance workers go out, and hanging on a warning board. In this measure, the warning board is easy to be ignored by the works of the power station. If the switch is incorrectly closed, the lives of the worker will be threatened. The second measure is locking the circuit breaker, and unlocking the circuit breaker and closing the switch after the maintenance workers go back. In this measure, safe problem is solved, but backing time of the workers is long and the efficiency is low.

In view of the above disadvantages, the present invention is invented after a lot of researches and practices.

SUMMARY OF THE PRESENT INVENTION

An object of the present invention is to provide an air circuit breaker with a self-locking function for overcoming the above disadvantages.

Accordingly, in order to accomplish the above objects, the present invention provides an air circuit breaker with a self-locking function, comprising an air circuit breaker body, wherein the circuit breaker further comprises:

an input unit for inputting a locking code and an unlocking code;

an authentication processing unit for receiving the locking code and the unlocking code from the input unit and outputting a control signal after authenticating; and a locking unit for receiving the control signal from the authentication processing unit and locking or unlocking the air circuit breaker body.

Preferably, the air circuit breaker body comprises:

a shell, wherein an output connecting block and an input connecting block are provided on the shell for connecting external lines, an amount thereof equals to an amount of phase lines, wherein the output connecting block is axially connected to a conducting moving contact block, the output connecting block is electrically connected or disconnected to the input connecting block by swinging the conducting moving contact block; and a breaking mechanism provided in the shell, comprising: a power unit and an action unit; wherein, the action unit swings the conducting moving contact block when triggered in such a manner that a circuit is opened or closed;

wherein the power unit provides power for instantly opening or closing the action unit.

Preferably, the power unit comprises:

an energy storage spring;

an energy storage action mechanism for transforming energy into potential energy of the energy storage spring; and a limiting mechanism for limiting the energy storage spring in such a manner that the potential energy is stored before the energy storage spring is released.

Preferably, the energy storage action mechanism comprises:

an input part;

a main axle connected to the input part for rotating therewith;

a first eccentric wheel mounted on the main axle;

a first linkage block connected to the first eccentric wheel for rotating therewith and providing corresponding swinging; and a pressing block connected to the first linkage block for compressing the energy storage spring.

Preferably, the limiting mechanism comprises:

a pawl linkage block axially connected in the shell, wherein the pawl linkage block is limited to rotating in a single direction by a limiting screw, the pawl linkage block has a trigger end and a limiting end; and a limiting wheel mounted on the main axle, wherein a plurality of limiting protrusions are provided on the limiting wheel, the limiting protrusions lean against the limiting end.

Preferably, the air circuit breaker further comprises a first restoring spring for restoring the pawl linkage block after being triggered.

Preferably, the action unit comprises:

a first linkage axle, wherein a traction element is provided thereon, the traction element is connected to the conducting moving contact block for towing and swinging the conducting moving contact block;

a second linkage block axially connected to the first linkage axle;

a third linkage block axially connected to the second linkage block, wherein a first end thereof is connected to the traction element;

a main restoring spring connected to the first end of the third linkage block for restoring the third linkage block;

a fourth linkage block axially connected to the first linkage block, wherein the fourth linkage block has a first top end and a second top end, the first top end leans against a limiting rod;

a fifth linkage block axially connected in the shell, wherein the fifth linkage block leans against the first top end and has a circuit breaking trigger end; and a rotating trigger block having a first leaning part and a pressing part, wherein the first leaning part leans against the fifth linkage block, the pressing part provides pressing actions if an external circuit breaking order is received.

Preferably, the air circuit breaker further comprises a second restoring spring, wherein when the rotating trigger block is pressed, the fifth linkage block is detached from the rotating trigger block, the second restoring spring is utilized in such a manner that the fifth linkage block rotates along an axle.

Preferably, the input unit comprises a keyboard.

Preferably, the authentication processing unit is a microprocessor.

Preferably, the locking unit comprises:

a first linkage element rotating along an axle;

a first linkage rod, wherein a first end thereof is connected to a second end of the first linkage element;

a rotating axle driven to rotate by the second end of the first linkage element;

a trigger part casing on the rotating axle and corresponding to the pressing part of the rotating trigger block, wherein the air circuit breaker body is opened by pressing the pressing part;

an electromagnet, wherein an armature end thereof is corresponding to a first end of the first linkage element; and an action control circuit for receiving the control signal in such a manner that an electrifying state of windings of the electromagnet is controlled.

Preferably, the action control circuit comprises:

a fourth triode and a seventh triode respectively connected to two output ends of the microprocessor;

an eighth triode, wherein a base thereof is connected to a collector of the fourth triode;

a sixth triode, wherein a base thereof is connected to an emitter of the fourth triode;

a fifth triode, wherein a base thereof is connected to an emitter of the seventh triode, an emitter of the sixth triode is connected to an emitter of the fifth triode, and a collector of the fifth triode is connected to an emitter of the eighth triode;

a ninth triode, wherein a emitter thereof is connected to a collector of the sixth triode; and a collector of the ninth triode is connected to a collector of the eighth triode;

a ninth diode provided between a base of the fourth triode and the emitter of the sixth triode; and a twelfth diode provided a base of the seventh triode and the emitter of the fifth triode;

wherein an input end and an output end of the windings of the electromagnet are respectively provide between the emitter of the fifth triode and the emitter of the sixth triode.

Preferably, a secondary self-locking mechanism comprises:

a loop mounted on the rotating axle, wherein a self-locking slot is provided on an inner wall of the loop;

a self-locking shell having a gap; and a self-locking block, wherein a third restoring spring is provided therein, the self-locking block has a self-locking end leaning against the inner wall of the loop.

Preferably, the input part is a handle and/or a motor.

Preferably, the input unit further comprises a wireless transceiver circuit and a remote controller, the wireless transceiver circuit is connected to the authentication processing unit for receiving a code inputted by the remote controller by a wireless method.

Therefore, when compared to conventional technologies, the present invention has advantages as follows. If maintenance workers haven't finished maintenance after cutting power, a circuit breaker can't be closed, and lives of the maintenance workers are not threatened. After long distance maintenance is finished, the maintenance workers can tell a code to a power station. The power station inputs the code for authenticating before closing a switch in such a manner that maintenance efficiency is improved.

These and other objectives, features, and advantages of the present invention will become apparent from the following detailed description, the accompanying drawings, and the appended claims.

DETAILED DESCRIPTION OF THE PREFERRED EMBODIMENT

Figure 1:
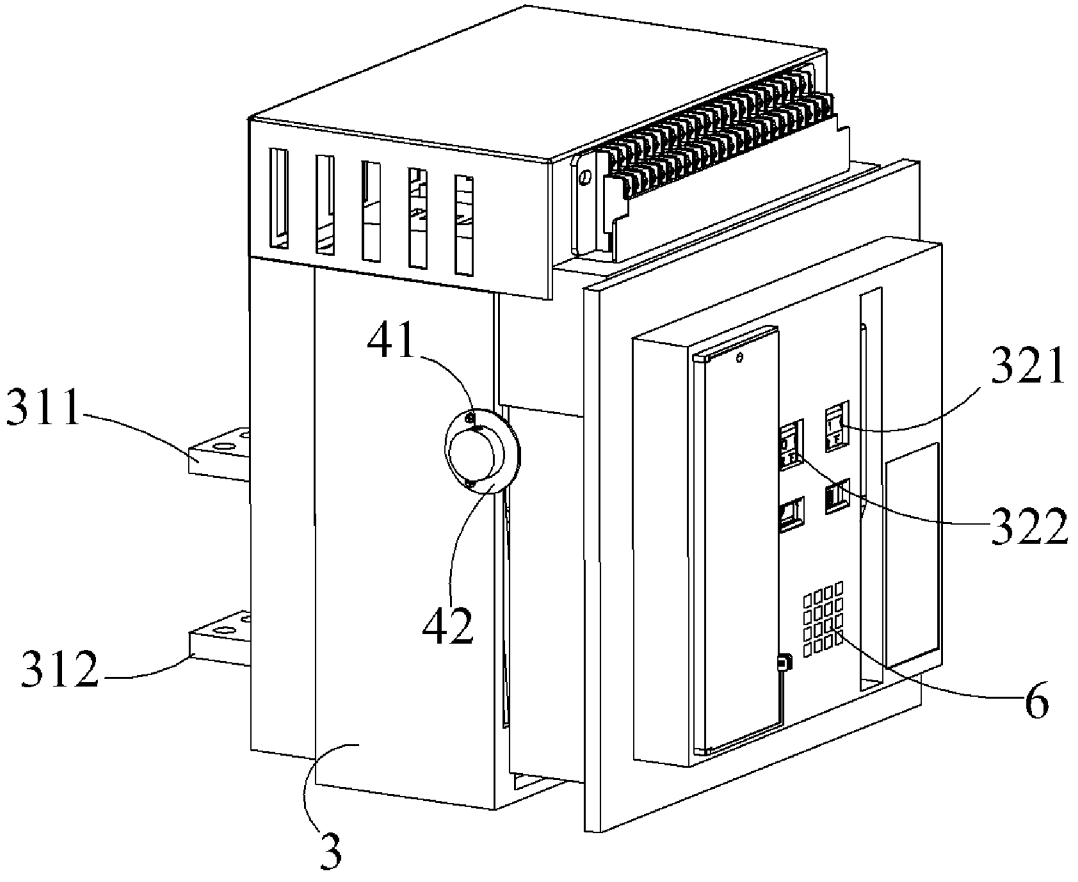
FIG. 1 is a perspective view of an air circuit breaker with a self-locking function according to the present invention.

Referring to the drawings, the above and other preferred embodiments of the present invention as well as advantages are illustrated.

Figure 2:
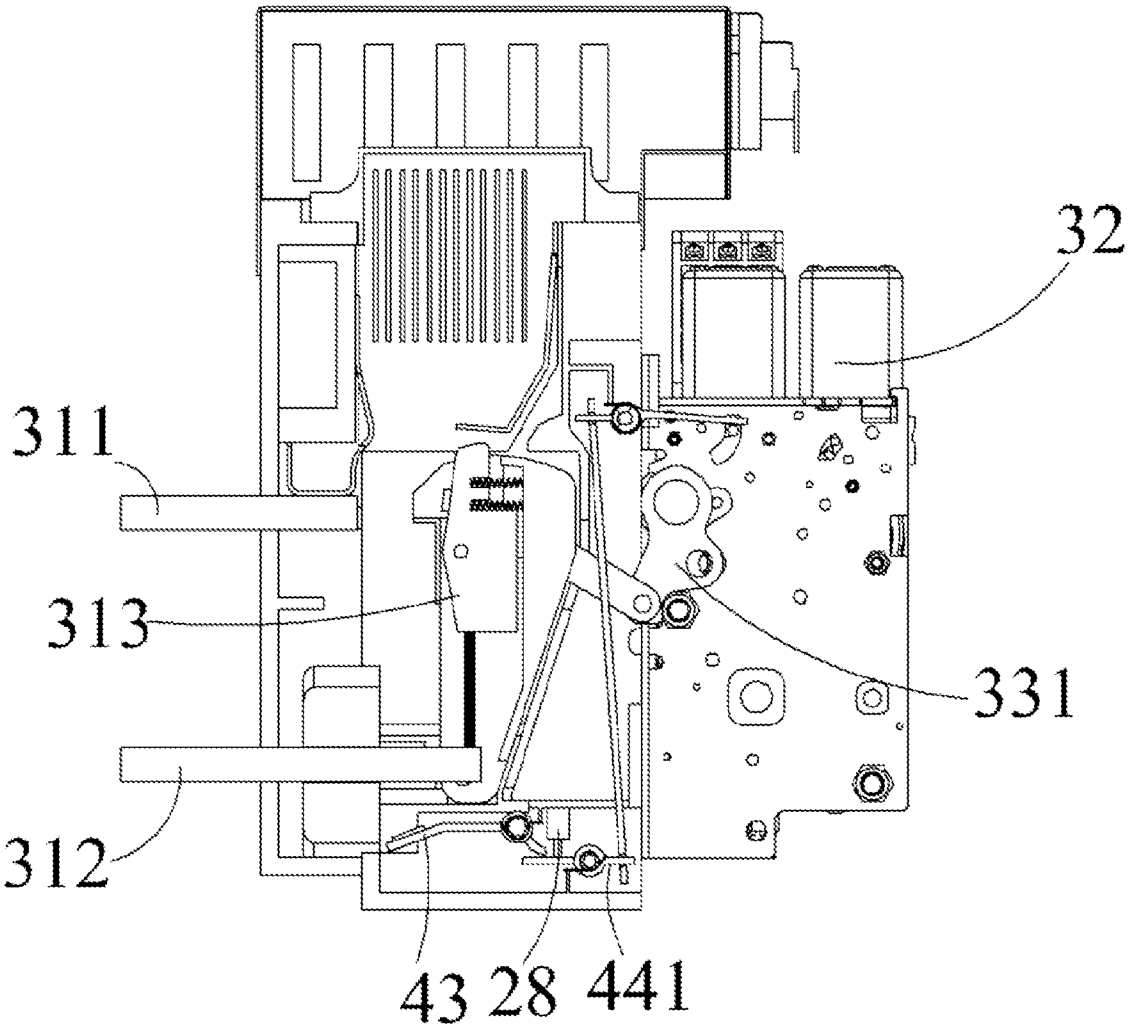
FIG. 2 is a first sectional view of the air circuit breaker according to the present invention.

Referring to the FIG. 1 and the FIG. 2 of the drawings, a perspective view and a first sectional view of an air circuit breaker with a self-locking function according to the present invention are illustrated. The air circuit breaker comprises: an air circuit breaker body for breaking a circuit and selectively opening or closing the circuit by a close bottom 321 or an open bottom 322 provided outside the air circuit breaker body, wherein the air circuit breaker body comprises:

a shell, wherein an output connecting block 312 and an input connecting block 311 are provided on the shell for connecting external lines, an amount thereof equals to an amount of phase lines, wherein the output connecting block 312 is axially connected to a conducting moving contact block 313, wherein axial connection is a kind of electrical connection, when the conducting moving contact block 313 contacts with the input connecting block 311, the output connecting block 312 is electrically connected or disconnected to the input connecting block 311 by swinging the conducting moving contact block 313; and a breaking mechanism (not shown in the drawings) provided in the shell for opening and closing the air circuit breaker body.

Preferably, an input unit 6 is provided on the shell for inputting a locking code and an unlocking code. The input unit 6 comprises a keyboard, wherein the keyboard can be a physical keyboard or a touch keyboard.

Figure 3:
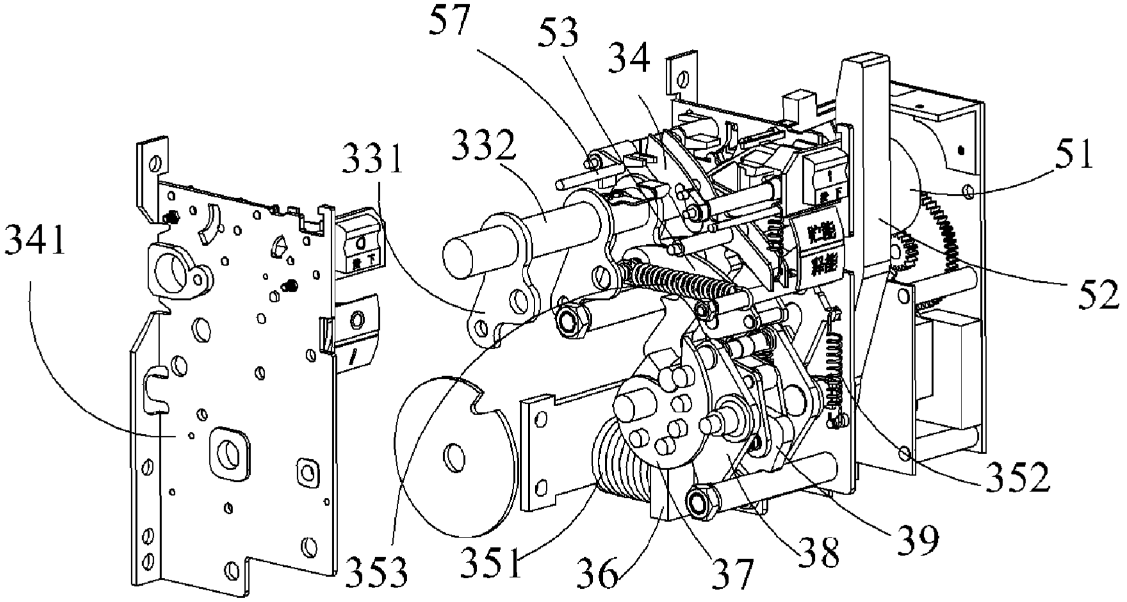
FIG. 3 is a partially exploded view of the air circuit breaker according to a preferred embodiment of the present invention.
Figure 4:
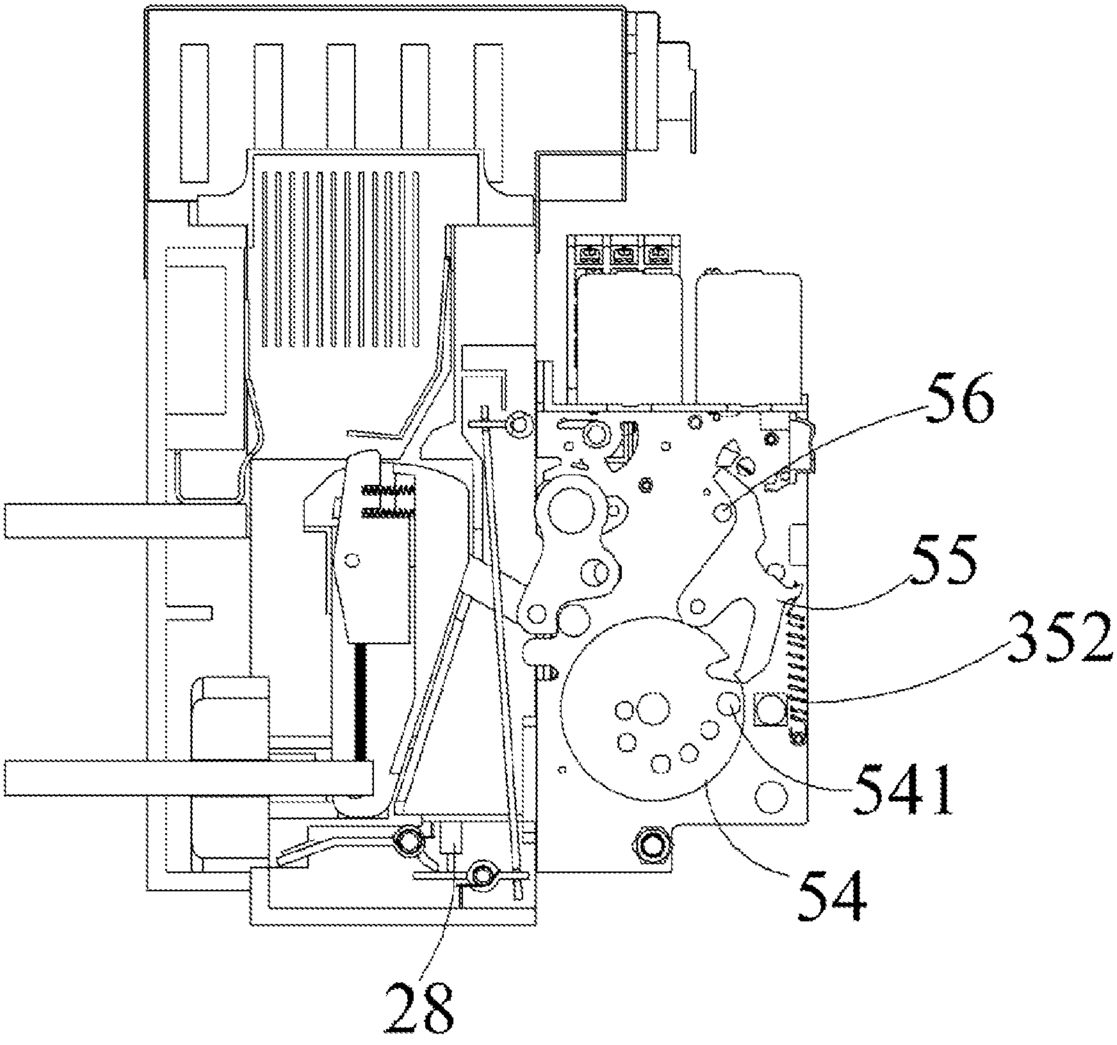
FIG. 4 is a second sectional view of the air circuit breaker according to the present invention.

Referring to the FIG. 3 and the FIG. 4 of the drawings, a section view, a perspective view and a second sectional view of the air circuit breaker with the self-locking function according to the present invention are illustrated. A structure of the breaking mechanism is mainly provided, wherein the breaking mechanism comprises: a power unit and an action unit; wherein, the action unit swings the conducting moving contact block 313 when triggered in such a manner that a circuit connected to the air circuit breaker body is opened or closed;

wherein the power unit provides power for instantly opening or closing the action unit.

Preferably, the power unit comprises:

an energy storage spring 36;

an energy storage action mechanism; and a limiting mechanism;

wherein the energy storage spring 36 can close the air circuit breaker body, the air circuit breaker body is instantly closed by releasing potential energy stored;

wherein the energy storage action mechanism transforms energy into the potential energy of the energy storage spring 36, the energy can be manual mechanical energy or mechanical energy transformed from electrical energy; wherein the energy storage action mechanism comprises:

an input part, wherein the input part can be a motor 51 or a handle 52 or both;

a main axle 32 rotating with the input part, wherein the main axle 32 is mounted on two support board 341 in the shell for transmitting torque;

a first eccentric wheel 37 mounted on the main axle 32, wherein when the main axle 32 rotates with the input part, the first eccentric wheel 37 rotates with the main axle;

a first linkage block 38 connected to the first eccentric wheel 37 for rotating therewith and providing corresponding swinging; and a pressing block 36 connected to the first linkage block 38, wherein when the torque from the input part is transmitted by the main axle 32, the first eccentric wheel 37 and the first linkage block 38, the pressing block 36 is pushed for compressing the energy storage spring.

The limiting mechanism keeps the potential energy of the energy storage spring 36 before released. That is to say, with the energy input by the input part, the pressing block 36 presses the energy storage spring 36, and the energy storage spring 36 cannot restore because of the limiting mechanism. Preferably, the limiting mechanism comprises:

a pawl linkage block 55 axially connected in the shell, wherein the pawl linkage block 55 is limited to rotating in a single direction by a limiting screw 56, the pawl linkage block 55 has a trigger end and a limiting end; and a limiting wheel 54 mounted on the main axle 32, wherein a plurality of limiting protrusions 541 are provided on the limiting wheel 54, the limiting protrusions 541 lean against the limiting end.

Preferably, the air circuit breaker further comprises a first restoring spring 352 hung on the pawl linkage block 55 for restoring the pawl linkage block 55 after being triggered.

Preferably, the trigger end of the pawl linkage block 55 leans against a leaning part 61. When the leaning part is triggered by an external device such as an electromagnet, the leaning part is detached from the trigger end, and limiting protrusions 541 of the limiting wheel 54 are detached from the limiting end. Because of an instant elastic force of the energy storage spring 36, the pressing block 36 is instantly pushed in such a manner that the first linkage block 38 instantly swings.

Preferably, the action unit gains energy and power from the power unit for swinging the conducting moving contact block 313 through a serious of transmission. Finally, the output connecting block 311 is electrically connected or disconnected to the input connecting block 312 by the action unit, wherein the power unit comprises:

a first linkage axle 332, wherein a traction element 331 is provided thereon, the traction element 331 is connected to the conducting moving contact block 313 for towing and swinging the conducting moving contact block 313;

a second linkage block 62 axially connected to the first linkage axle 332;

a third linkage block 53 axially connected to the second linkage block 62, wherein a first end thereof is connected to the traction element 331;

a main restoring spring 353 connected to the first end of the third linkage block 53 for restoring the third linkage block 53;

a fourth linkage block 39 axially connected to the first linkage axle 38, wherein the fourth linkage block has a first top end and a second top end, the first top end leans against a limiting rod 63;

a fifth linkage block 34 axially connected in the shell, wherein the fifth linkage block leans against the first top end and has a circuit breaking trigger end; and a rotating trigger block 57 having a first leaning part and a pressing part, wherein the first leaning part leans against the fifth linkage block 34, the pressing part provides pressing actions if an external circuit breaking order is received. According to the present embodiment, the pressing part is a round bar extending outward. For example, an armature end of the electromagnet leans against the pressing part of the rotating trigger block 57. When the electromagnet is electrified according to an external order, the armature end presses the pressing end in such a manner that the leaning end is detached from the fifth linkage block 34 for opening the air circuit breaker body.

Preferably, the air circuit breaker further comprises a second restoring spring 352, wherein when the rotating trigger block 57 is pressed, the fifth linkage block 34 is detached from the rotating trigger block 57, the second restoring spring 352 is utilized in such a manner that the fifth linkage block 34 rotates along an axle.

Figure 5:
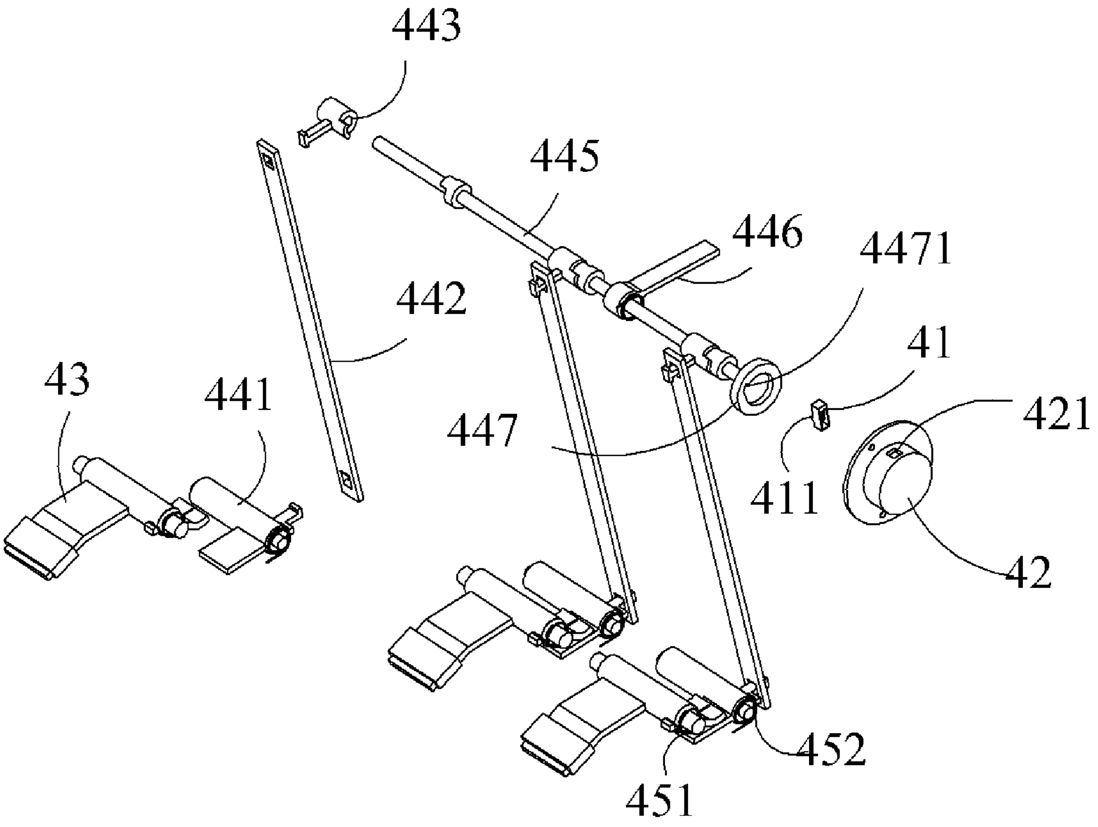
FIG. 5 is an exploded view of a locking unit of the air circuit breaker according to the present invention.

Referring to the FIG. 5 of the drawings, an exploded view of a locking unit of the air circuit breaker with the self-locking function according to the present invention is illustrated, wherein a structure providing the self-locking function under a short circuit condition is showed, which is a feature of the present invention. That is to say, the self-locking function is provided if the short circuit condition is occurred. Preferably, the locking unit comprises:

a short circuit detection element axially connected in the air circuit breaker body, wherein when a phase line connected to the air circuit breaker body is short-circuited, a strong magnetic field is surely generated; because the short circuit detection element is axially connected, a mechanical rotating action is provided; the short circuit detection element comprises at least one rotating magnetic element 43; preferably, the short circuit detection element comprises three rotating magnetic elements 43 respectively corresponding to the output connecting block 312; when the magnetic field is generated by the short circuit, the rotating magnetic element rotates; a restoring spring 451 is provided on the rotating magnetic element 43 and rotates therewith; the restoring spring 451 has an induction section and a pressing section; the induction section is provided near the output connecting block 312 or the input connecting block 311; according to the preferred embodiment, the induction section is provided under the output connecting block 312;

a short circuit trigger mechanism connected to the short circuit detection element, wherein the short circuit trigger mechanism has a trigger end connected to the breaking mechanism of the air circuit breaker body; when the short circuit trigger mechanism is in linkage with the rotation of the short circuit detection element, the trigger end activates the breading mechanism for breaking the circuit; wherein the short circuit trigger mechanism comprises:

a first linkage element 441 rotating along an axle, wherein a first end of the first linkage element 441 leans against the pressing section of the rotating magnetic element 43; wherein the first linkage element 441 comprises:

a restoring spring 452 provided on a axle of the first linkage element 441 for restoring;

a first linkage rod 442, wherein a first end thereof is connected to a second end of the first linkage element 441;

a rotating axle 445 driven to rotate by the second end of the first linkage rod 442; and a trigger part 446 casing on the rotating axle 445 and corresponding to the pressing part of the rotating trigger block 57, wherein the air circuit breaker body is opened by pressing the pressing part.

When the short circuit occurs, the above structure can open the air circuit breaker body. However, the short circuit trigger mechanism without the magnetic field will be restored by the restoring spring 451 and the restoring spring 452 after cutting the power and a corresponding closing order can close the air circuit breaker body again. If the short circuit is not fixed, the magnetic rotating element 43 of the short circuit will be in linkage with the short circuit trigger mechanism again for opening the circuit. Continuously switching the air circuit breaker body between a close state and an open state will affect a life of the air circuit breaker body or other devices in the power grid.

In order to accomplish the self-locking function of the present invention, which means under the normal condition, the maintenance is provided without accidents due to closing the circuit, a corresponding structure further comprises:

an authentication processing unit mounted on a control circuit for receiving the code from the input unit 6 and outputting a control signal after authenticating; and a locking unit for receiving the control signal from the authentication processing unit and locking or unlocking the air circuit breaker body by the breaking mechanism.

Preferably, the locking unit according to the preferred embodiment comprises:

an electromagnet 28, wherein an armature end thereof is corresponding to the first end of the first linkage element 441; and an action control circuit for receiving the control signal in such a manner that an electrifying state of windings of the electromagnet 28 is controlled.

For a better performance, a secondary self-locking mechanism is provided, wherein the secondary self-locking mechanism also prevents the breaking mechanism from being restored. The secondary self-locking mechanism can be not utilized for setting the self-locking function. The secondary self-locking mechanism comprises:

a loop 447 mounted on the rotating axle 445, wherein a self-locking slot 2471 is provided on an inner wall of the loop 447;

a self-locking shell 42 having a gap 421, wherein the self-locking shell 42 is mounted on the shell of the air circuit breaker body; and a self-locking block 41, wherein a third restoring spring is provided therein, the self-locking block has a self-locking end leaning against the inner wall of the loop 447, when the short circuit occurs, the self-locking end embeds in the self-locking slot 4471.

Figure 6A:
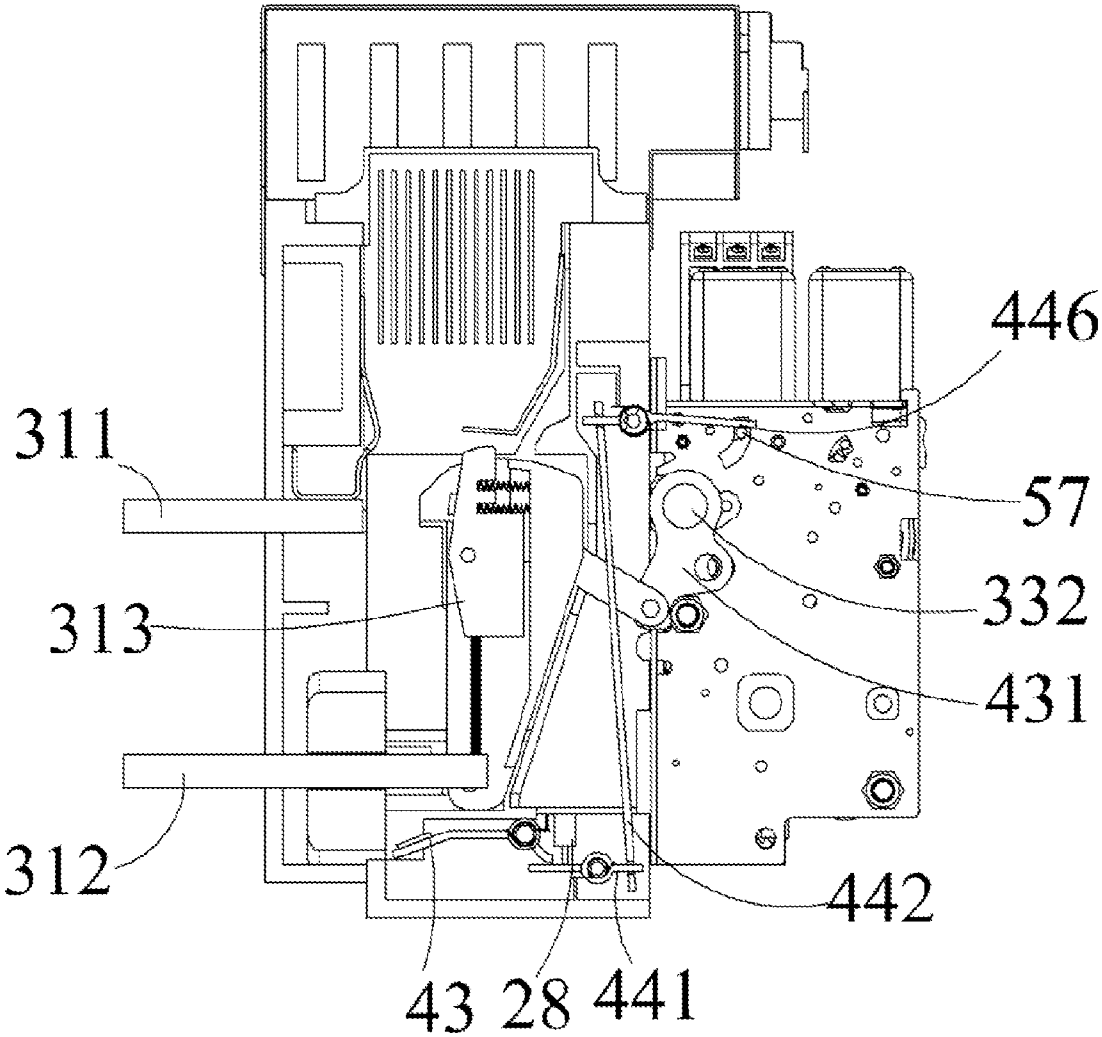
FIG. 6A is a sectional view of an opened air circuit breaker under a normal condition according to the present invention.
Figure 6B:
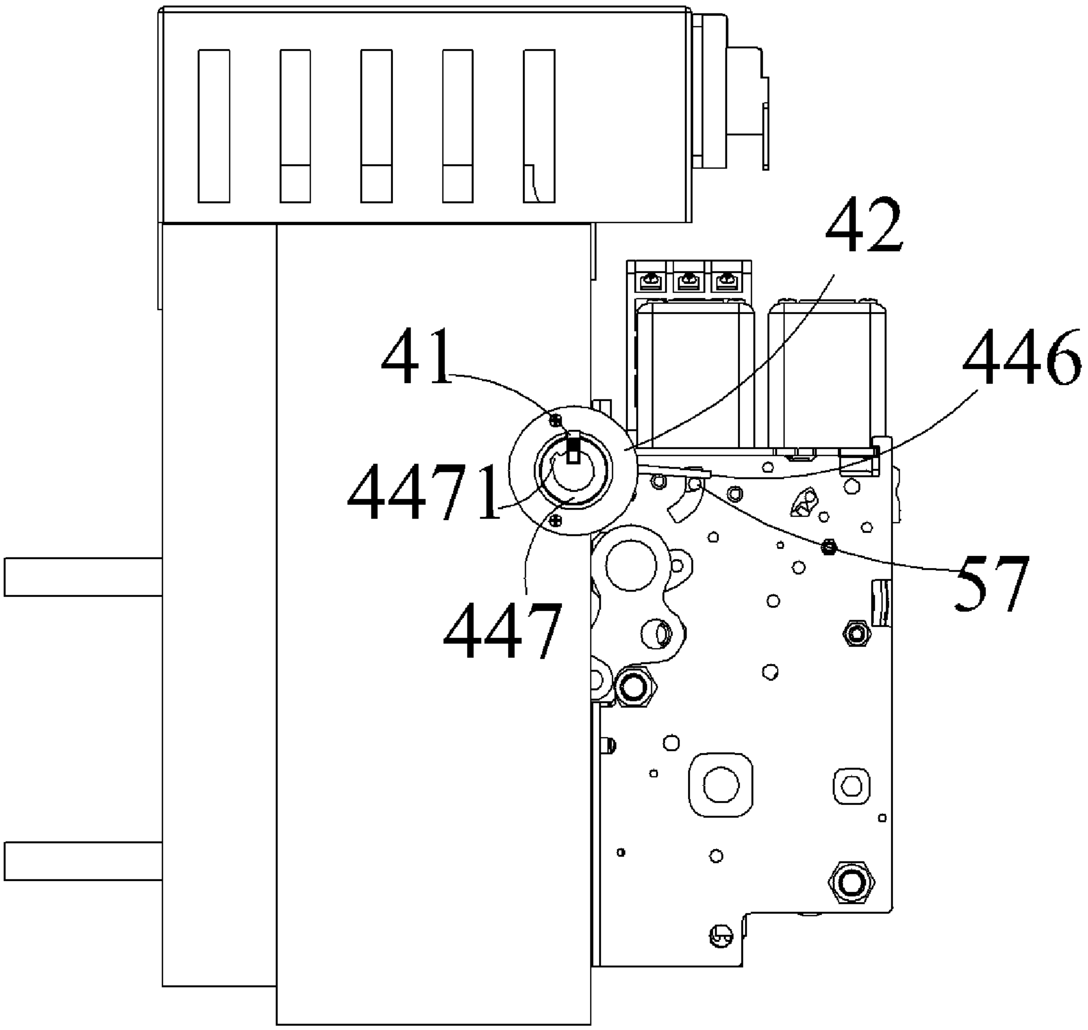
FIG. 6B is a side view of the opened air circuit breaker under the normal condition according to the present invention.

Referring to the FIG. 6A and the FIG. 6B of the drawings, a sectional view and a side view of the opened air circuit breaker under a normal condition according to the present invention are illustrated, wherein at this time, the present invention is in the open state, the conducting moving contact block 313 is detached from the input connecting block 311. The conducting moving contact block 313 is provided under the output connecting block 312 and doesn't rotate because of no short circuit magnetic field. At the same time, the short circuit trigger mechanism is in a normal state. The self-locking block 41 is detached from the self-locking slot 4471.

At the same time, no locking code is inputted into the input unit, and no action is provided by the locking unit.

Figure 7A:
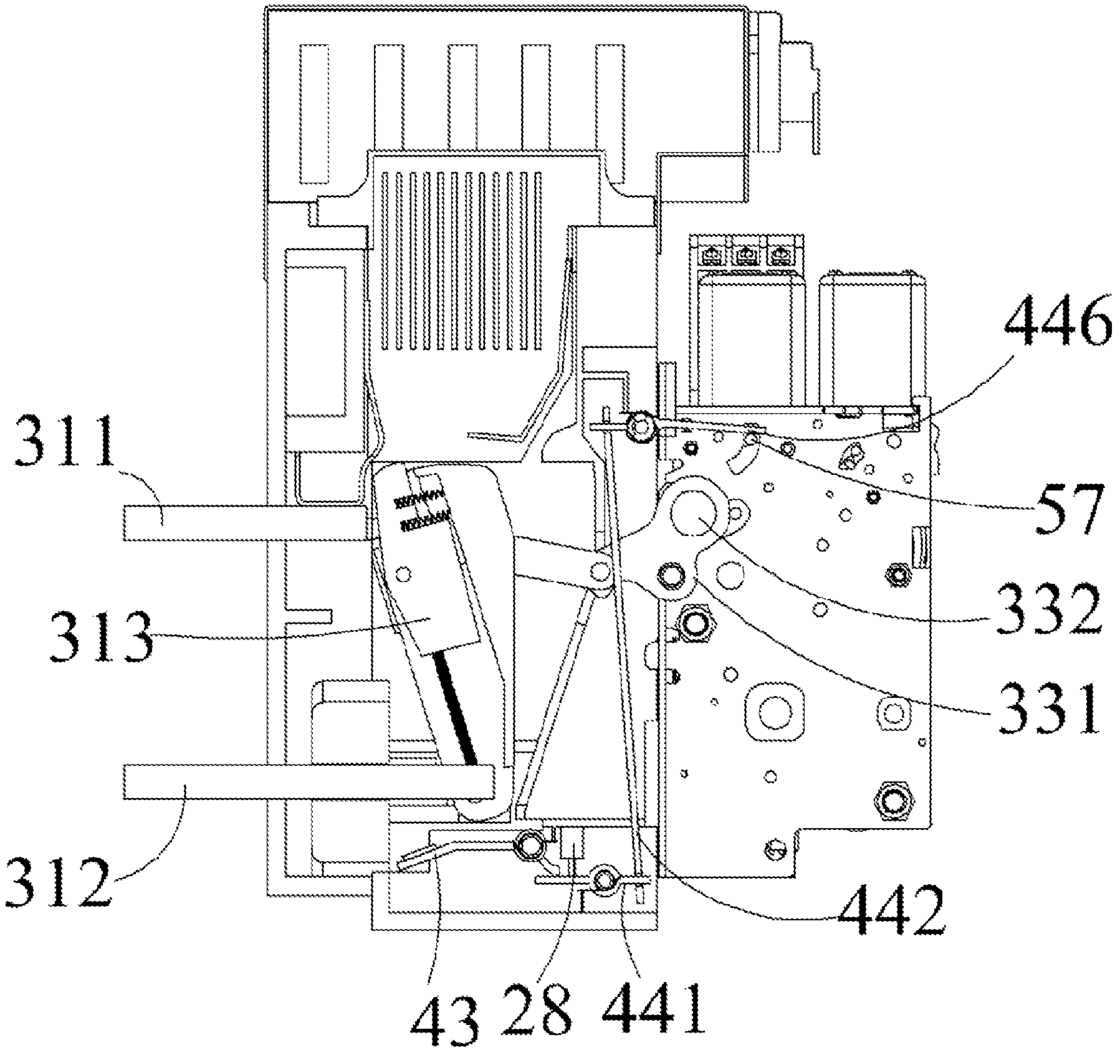
FIG. 7A is a sectional view of a closed air circuit breaker under a normal condition according to the present invention.
Figure 7B:
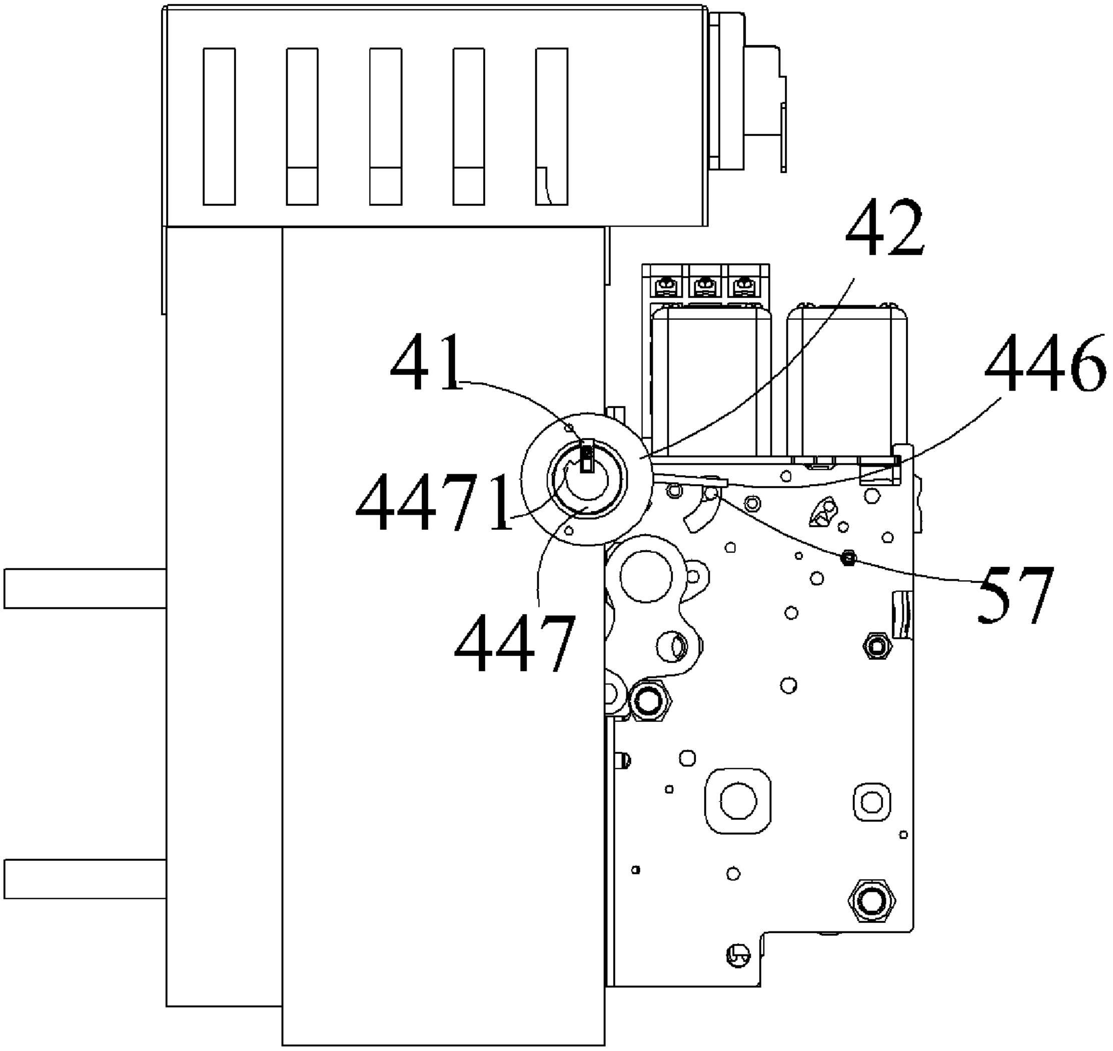
FIG. 7B is a side view of the closed air circuit breaker according to the present invention.

Referring to the FIG. 7A and the FIG. 7B of the drawings, a sectional view and a side view of a closed air circuit breaker under the normal condition according to the present invention are illustrated, wherein at this time, compared to the FIG. 6A and the FIG. 6B, the present invention is in the close state, the conducting moving contact block 313 contacts with the input connecting block 311. The conducting moving contact block 313 is provided under the output connecting block 312 and doesn't rotate because of no short circuit magnetic field. The short circuit trigger mechanism is also in a normal state. The self-locking block 41 is detached from the self-locking slot 4471.

Figure 8A:
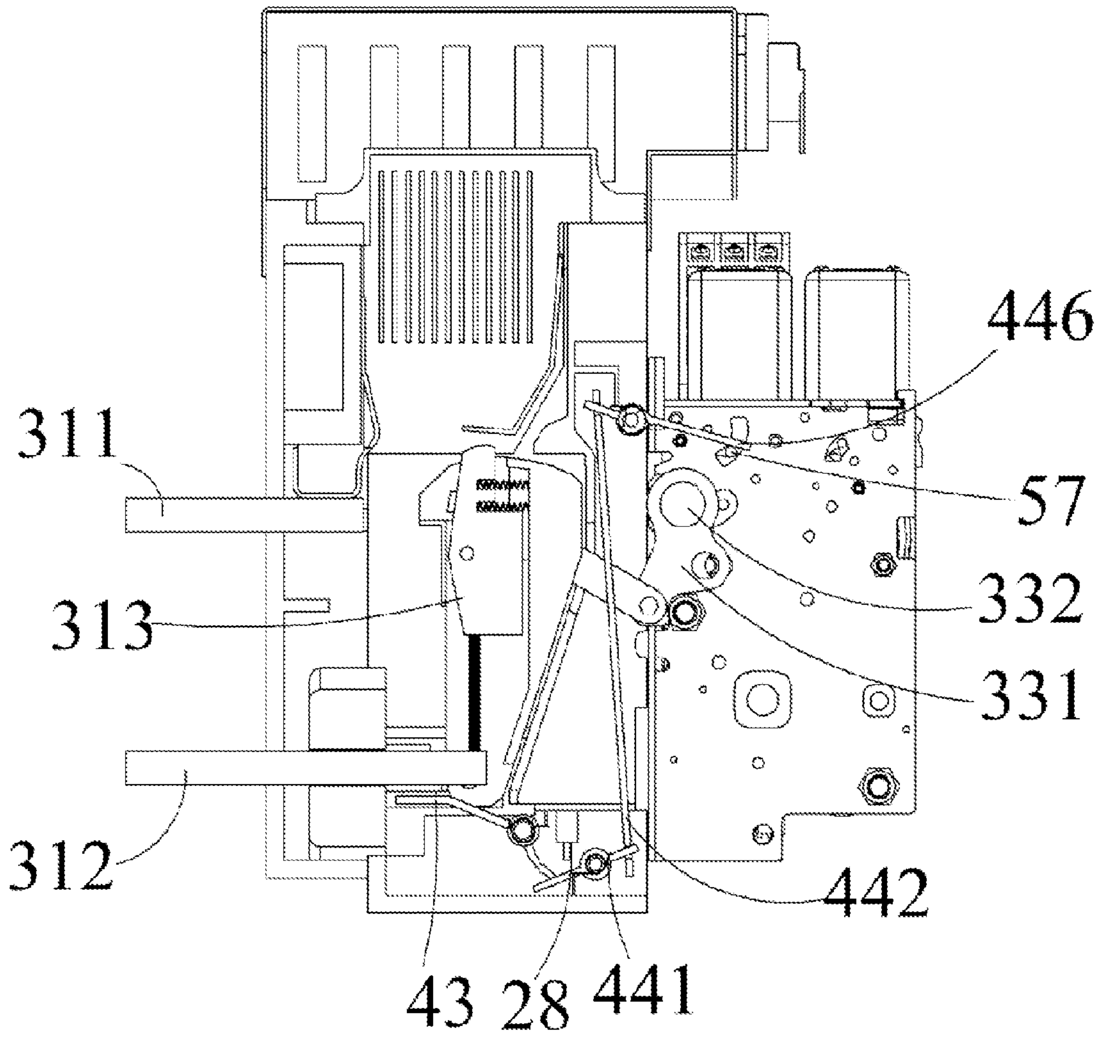
FIG. 8A is a sectional view of the air circuit breaker in a self-locking state caused by a short circuit according to the present invention.
Figure 8B:
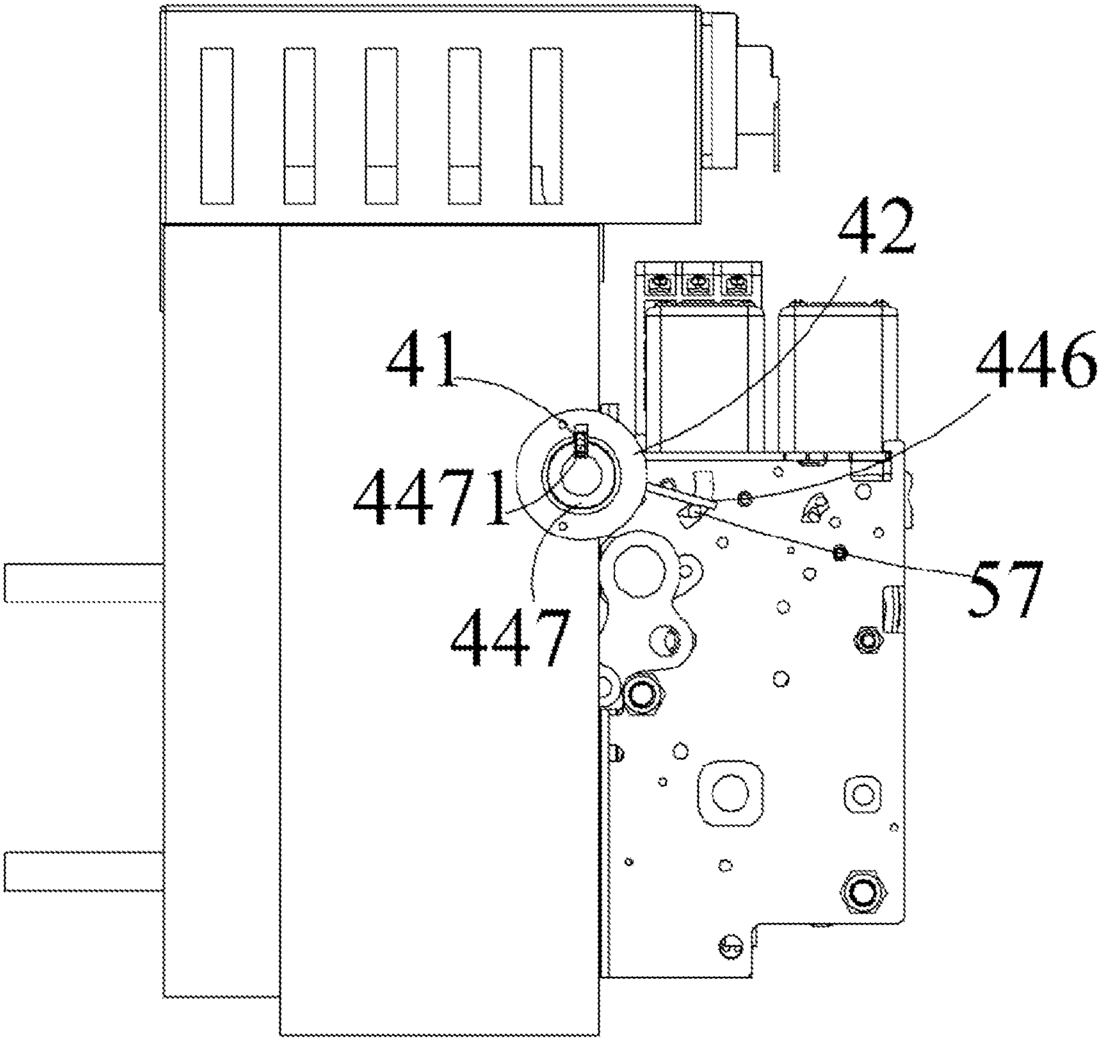
FIG. 8B is a side view of the air circuit breaker in the self-locking state caused by the short circuit according to the present invention.

Referring to the FIG. 8A and the FIG. 8B of the drawings, a sectional view and a side view of the air circuit breaker in a self-locking state caused by the short circuit according to the present invention are illustrated, wherein when the short circuit occurs, the strong magnet is generated, the induction section of the rotating magnetic elements 43 swings to the output connecting block 312 in such a manner that the pressing section presses the first linkage element 441. The first linkage element 441 swings after being pressed and pushes the first linkage rod 442 in such a manner that the rotating axle 445 rotates. Then the trigger part 446 swings for pressing the pressing part of the rotating trigger block 57. And the air circuit breaker body is broken by pressing the pressing part.

At the meantime, the loop 447 rotates with the rotating axle 445 in such a manner that the self-locking end of the self-locking block 41 embeds in the self-locking slot 4471 and extends out of the gap 421 of the self-locking shell 42 by being pushed by the third restoring spring 411.

With the foregoing structure, the air circuit breaker is broken, the strong magnetic field due to the short circuit disappears, and the rotating magnetic element 43 restores by the restoring spring 451. However, because the self-locking block 41 extends out of the gap 421 of the self-locking shell 42, the self-locking end cannot detach from the self-locking slot 4471, and the rotating axle 445 cannot rotate in such a manner that the trigger part 446 still presses the pressing part of the rotating trigger block 57 for providing self-locking.

Figure 9A:
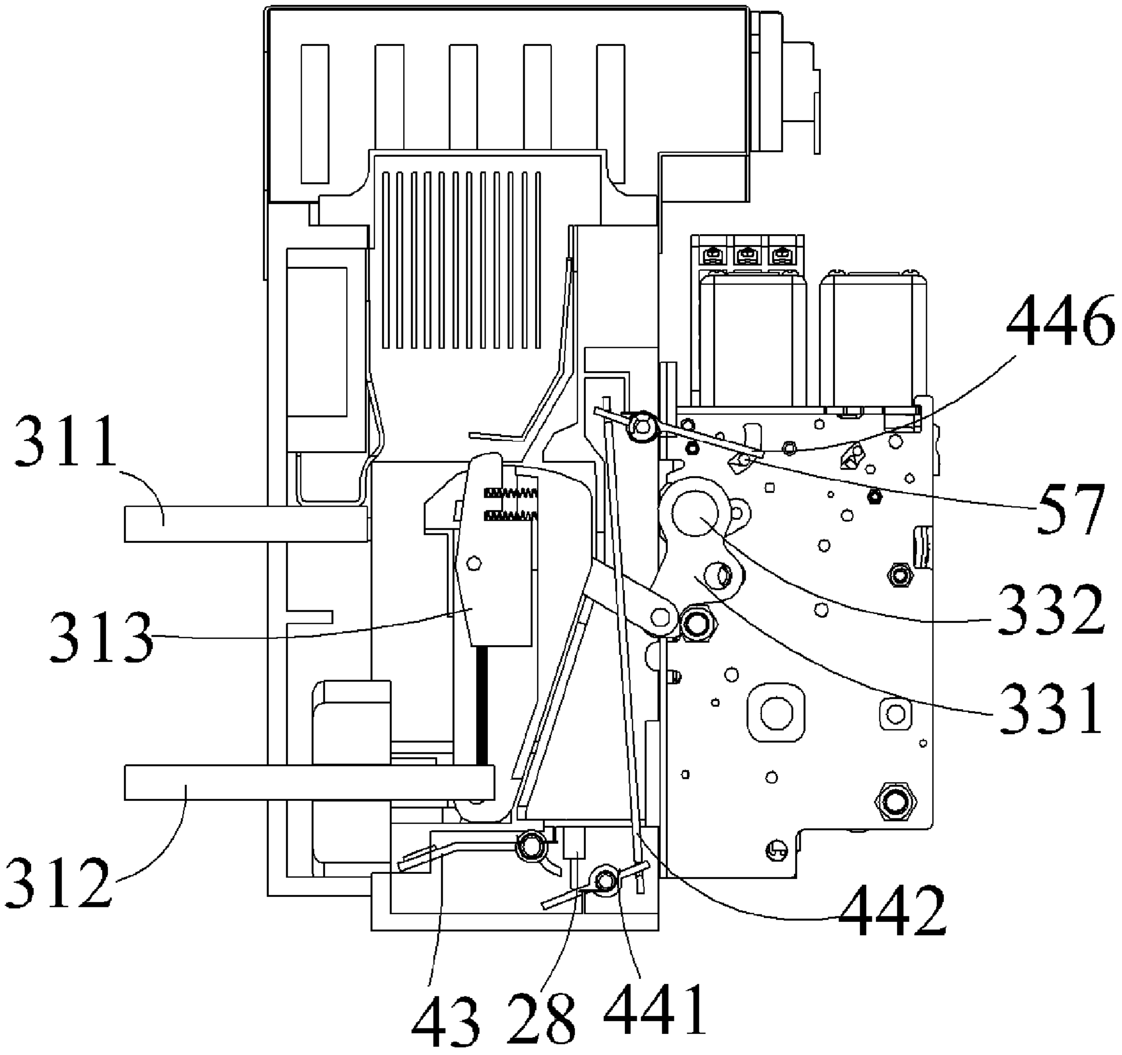
FIG. 9A is a sectional view of the air circuit breaker set to the self-locking state according to the present invention.
Figure 9B:
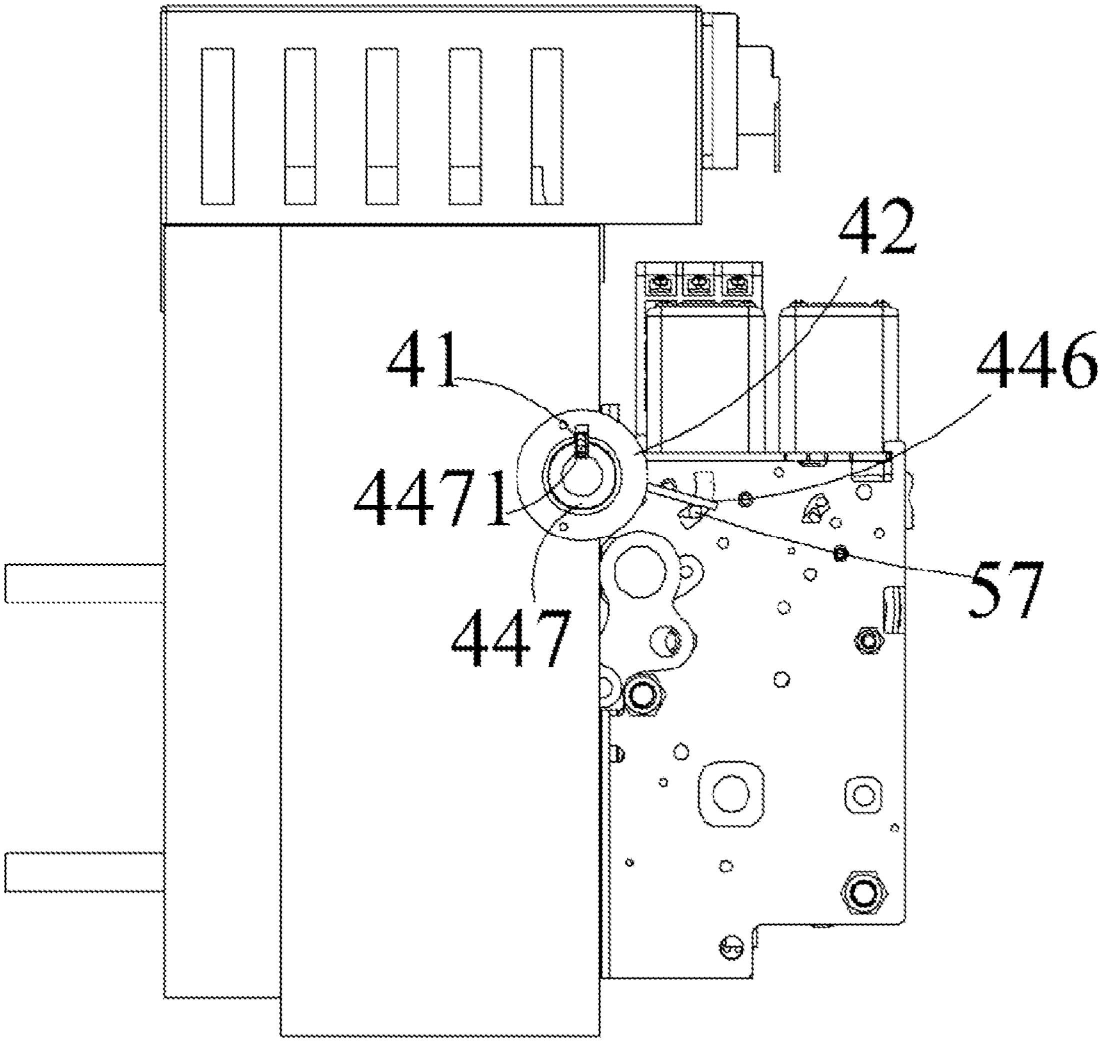
FIG. 9B is a side view of the air circuit breaker set to the self-locking state according to the present invention.

Referring to the FIG. 9A and the FIG. 9B of the drawings, a sectional view and a side view of the air circuit breaker with the self-locking function set to the self-locking state according to the present invention are illustrated, wherein when the circuit is open, the locking code can be input through the input unit. At this time, the locking unit receives the control signal from the authentication processing unit and electrifies the windings of the electromagnet 28. The armature end pushes the first end of the first linkage element 441 for swinging the first linkage element 441. The first linkage rod 442 is pushed by the first linkage element 441 in such a manner that the rotating axle 445 rotates. The trigger part swings for pressing the pressing part of the rotating trigger block 57 and providing the self-locking.

When the locking code is inputted through the input unit, the locking unit receives the control signal from the authentication processing unit for cutting the powder of the windings of the electromagnet 28 or reserving currency. The armature end is detached from the first end of the first linkage element 441 by the restoring spring of a reserve magnetic force. The first linkage element 441 restores by the restoring spring 451 and 452 in such a manner that the first linkage rod 442 is pulled back by the first linkage element 441 in such a manner that the rotating axle 445 rotates back. The trigger part swings back in such a manner that the pressing part of the rotating trigger block 57 can be detached.

For unlocking, when an unlocking code is inputted, the self-locking block 41 should be pushed back to the self-locking shell 42 manually for detaching the self-locking end from the self-locking slot 4471. Thus, the trigger part 446 is detached from the pressing part of the rotating trigger block 57 by the restoring spring 452 provided on the axle of the first linkage element 441 for unlocking. Then the circuit can be closed again. When short circuit occurs, just pushing the self-locking block 41 back to the self-locking shell 42 for unlocking, and no unlocking code is needed.

Figure 10:
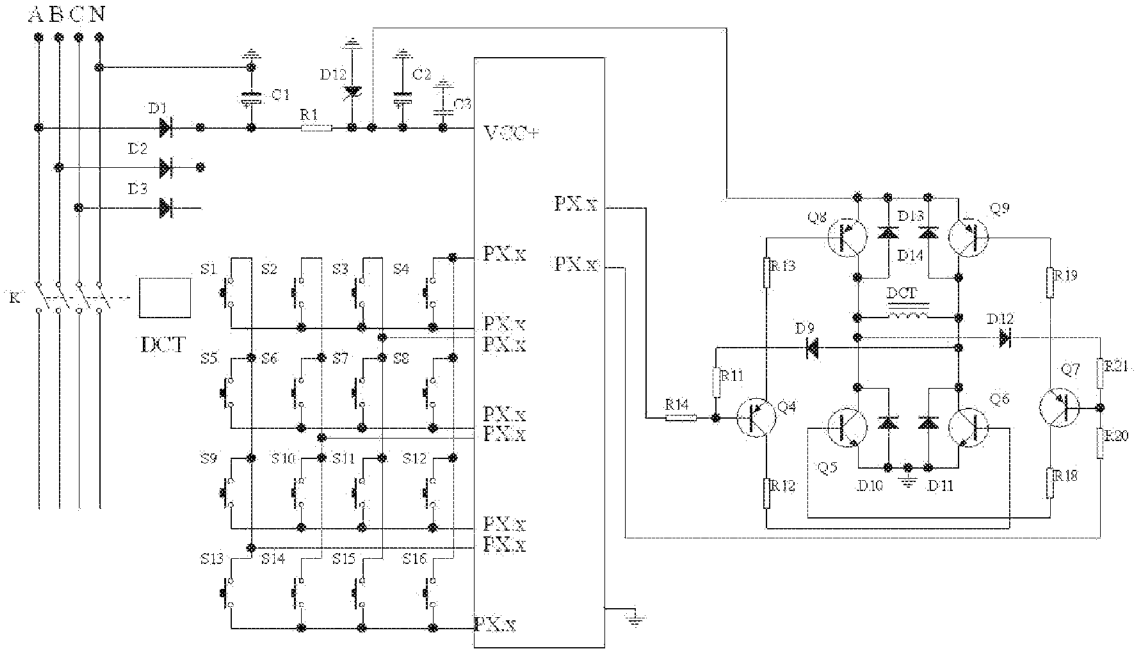
FIG. 10 is a perspective view of a control circuit of the air circuit breaker according to a preferred embodiment 1 of the present invention.

Referring to the FIG. 10 of the drawings, a perspective view of a control circuit of the air circuit breaker with the self-locking function according to a preferred embodiment 1 of the present invention is illustrated, wherein the control circuit comprises a supply circuit;

the input unit 6;

the authentication processing unit; and the action control circuit.

Currency signals are inputted to the supply circuit through the phase lines A, B and C. The currency signals pass through a first diode D1, a second diode D2 and a third diode D3 for rectifying. Then the currency signals pass through a capacity C1 for filtering and resistance R1 for reducing a voltage. An output voltage is stabilized by a stabilivolt D12. The supply circuit provides a stable voltage to the electrical components by the stabilivolt D12.

Code information is inputted to the input unit 6 by bottoms S1 to S16 and sent to the authentication processing unit. A fingerprint collector can replace the keyboard of the input unit 6. Code signals input are the locking code or the unlocking code. The authentication processing unit can be a microprocessor.

The action control circuit comprises:

a fourth triode Q4 and a seventh triode Q7 respectively connected to two output ends of the microprocessor;

an eighth triode Q8, wherein a base thereof is connected to a collector of the fourth triode Q4;

a sixth triode Q6, wherein a base thereof is connected to an emitter of the fourth triode Q4;

a fifth triode Q5, wherein a base thereof is connected to an emitter of the seventh triode Q7, an emitter of the sixth triode Q6 is connected to an emitter of the fifth triode Q5, and a collector of the fifth triode Q5 is connected to an emitter of the eighth triode Q8;

a ninth triode Q9, wherein a emitter thereof is connected to a collector of the sixth triode Q6; and a collector of the ninth triode Q9 is connected to a collector of the eighth triode Q8;

a ninth diode D9 provided between a base of the fourth triode Q4 and the emitter of the sixth triode Q6; and a twelfth diode D12 provided a base of the seventh triode Q7 and the emitter of the fifth triode Q5;

wherein an input end and an output end of the windings of the electromagnet are respectively provide between the emitter of the fifth triode Q5 and the emitter of the sixth triode Q6.

When the breaker is opened, the locking code inputted by the input unit for the first time is identified and stored by the authentication processing unit. The electromagnet DTC is driven by the action control circuit and is in a working state. And the breaker cannot be closed at this moment.

The unlocking code is inputted by the input unit 6. The microprocessor determines whether the unlocking code inputted is the same as a predetermined unlocking code before changing electric potential of a first output end and a second output end PXx of the microprocessor (wherein the first and the second output end are judged according to the drawings from a top to a bottom).

If the unlocking code inputted is not the same as the predetermined unlocking code, potential difference of both ends of the electromagnet DCT is not changed. If the unlocking code inputted is the same as the predetermined unlocking code, the potential difference of both ends of the electromagnet DCT is changed for taking back an armature and unlocking.

Figure 11:
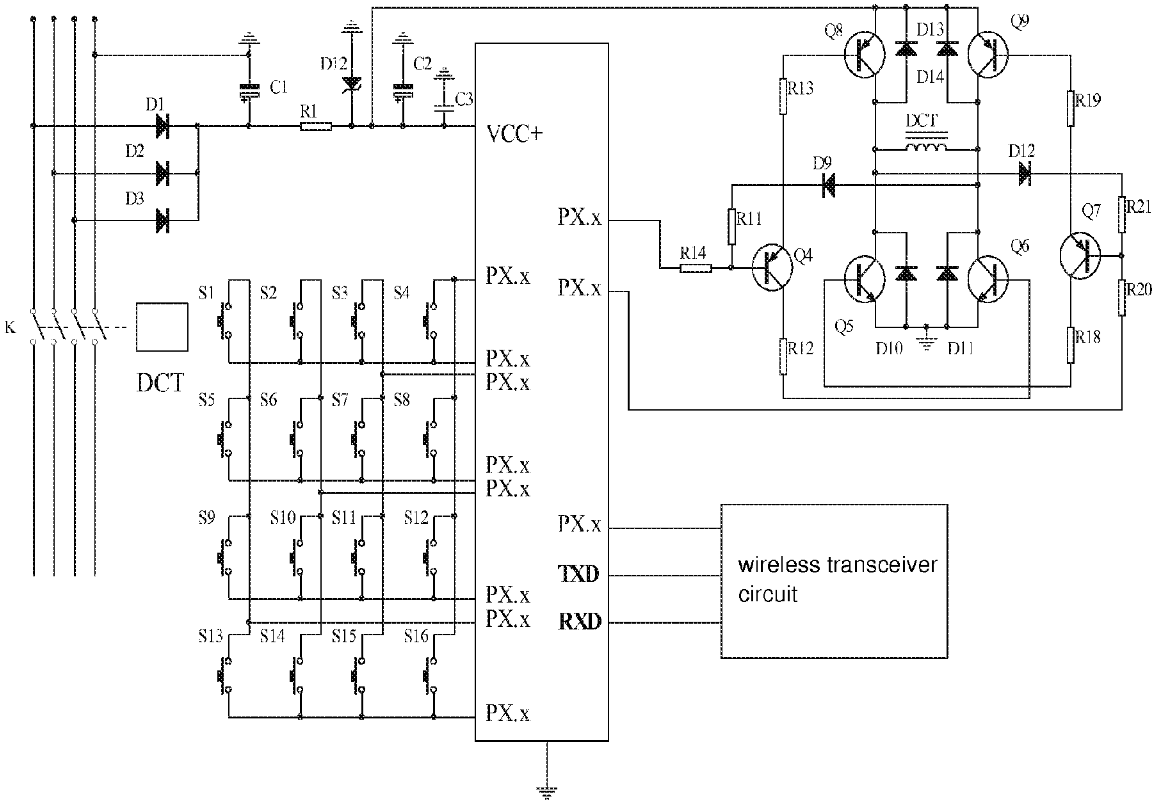
FIG. 11 is a perspective view of a control circuit of the air circuit breaker according to a preferred embodiment 2 of the present invention.

Referring to the FIG. 11 of the drawings, a perspective view of a control circuit of the air circuit breaker with the self-locking function according to a preferred embodiment 2 of the present invention is illustrated, wherein the input unit further comprises a wireless transceiver circuit and a remote controller, the wireless transceiver circuit is connected to the authentication processing unit, the wireless transceiver circuit can be connected through the remote controller for operating the authentication processing unit through operating the remote controller. Otherwise, independently operating the remote controller and avoiding touching the breaker are safe and convenient. After orders are inputted, processing procedures of the authentication processing unit are the same as the processing procedures of the preferred embodiment utilizing the keyboard. Furthermore, a priority level can be set for the keyboard and the remote controller for detailed otherness operations.

Figure 12:
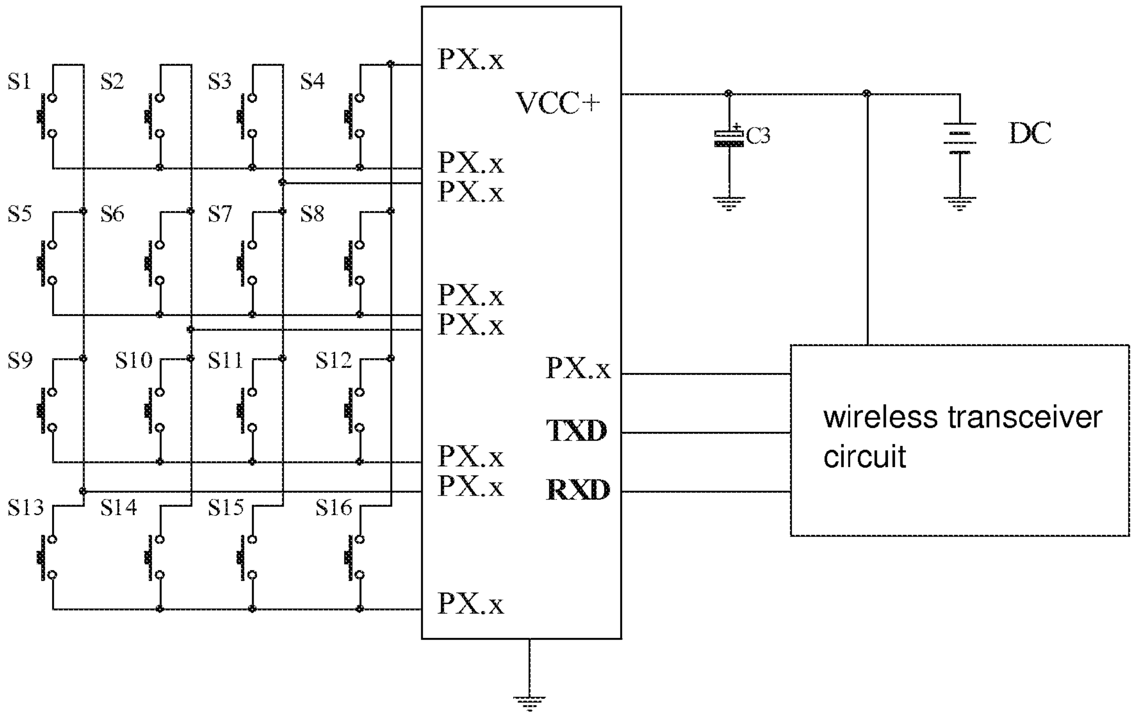
FIG. 12 is a perspective view of a control circuit of the air circuit breaker which is corresponding to a remote controlled circuit according to the present invention.

Referring to the FIG. 12 of the drawings, a perspective view of a control circuit of the air circuit breaker with the self-locking function which is corresponding to a remote controlled circuit according to the present invention is illustrated, wherein the remote controller comprises:

a button part S1~S16;

a processor connected to the button part S1~S16; and a wireless transceiver circuit connected to the processor and corresponding to the wireless transceiver circuit of the input unit 6 which is connected to the authentication processing unit; therefore, the remote controller has an authority for controlling the air circuit breaker with the self-locking function.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. An air circuit breaker with a self-locking function, comprising an air circuit breaker body, wherein said circuit breaker further comprises:

an input unit for inputting a locking code and an unlocking code;

an authentication processing unit for receiving said locking code and said unlocking code from said input unit and outputting a control signal after authenticating; and a locking unit for receiving said control signal from said authentication processing unit and locking or unlocking said air circuit breaker body;

wherein said air circuit breaker body comprises:

a shell, wherein an output connecting block and an input connecting block are provided on said shell for connecting external lines, an amount thereof equals to an amount of phase lines, wherein said output connecting block is axially connected to a conducting moving contact block, said output connecting block is electrically connected or disconnected to said input connecting block by swinging said conducting moving contact block; and a breaking mechanism provided in said shell, comprising: a power unit and an action unit; wherein, said action unit swings said conducting moving contact block when triggered in such a manner that a circuit is opened or closed;

wherein said power unit provides power for instantly opening or closing said action unit.

2. The air circuit breaker, as recited in claim 1, wherein said power unit comprises:

an energy storage spring;

an energy storage action mechanism for transforming energy into potential energy of said energy storage spring; and a limiting mechanism for limiting said energy storage spring in such a manner that said potential energy is stored before said energy storage spring is released.

3. The air circuit breaker, as recited in claim 2, wherein said energy storage action mechanism comprises:

an input part;

a main axle connected to said input part for rotating therewith;

a first eccentric wheel mounted on said main axle;

a first linkage block connected to said first eccentric wheel for rotating therewith and providing corresponding swinging; and a pressing block connected to said first linkage block for compressing said energy storage spring.

4. The air circuit breaker, as recited in claim 2, wherein said limiting mechanism comprises:

a pawl linkage block axially connected in said shell, wherein said pawl linkage block is limited to rotating in a single direction by a limiting screw, said pawl linkage block has a trigger end and a limiting end; and a limiting wheel mounted on said main axle, wherein a plurality of limiting protrusions are provided on said limiting wheel, said limiting protrusions lean against said limiting end.

5. The air circuit breaker, as recited in claim 4, further comprises a first restoring spring for restoring said pawl linkage block after being triggered.

6. The air circuit breaker, as recited in claim 1, wherein said action unit comprises:

a first linkage axle, wherein a traction element is provided thereon, said traction element is connected to said conducting moving contact block for towing and swinging said conducting moving contact block;

a second linkage block axially connected to said first linkage axle;

a third linkage block axially connected to said second linkage block, wherein a first end thereof is connected to said traction element;

a main restoring spring connected to said first end of said third linkage block for restoring said third linkage block;

a fourth linkage block axially connected to said first linkage block, wherein said fourth linkage block has a first top end and a second top end, said first top end leans against a limiting rod;

a fifth linkage block axially connected in said shell, wherein said fifth linkage block leans against said first top end and has a circuit breaking trigger end; and a rotating trigger block having a first leaning part and a pressing part, wherein said first leaning part leans against said fifth linkage block, said pressing part provides pressing actions if an external circuit breaking order is received.

7. The air circuit breaker, as recited in claim 4, wherein said action unit comprises:

a first linkage axle, wherein a traction element is provided thereon, said traction element is connected to said conducting moving contact block for towing and swinging said conducting moving contact block;

a second linkage block axially connected to said first linkage axle;

a third linkage block axially connected to said second linkage block, wherein a first end thereof is connected to said traction element;

a main restoring spring connected to said first end of said third linkage block for restoring said third linkage block;

a fourth linkage block axially connected to said first linkage block, wherein said fourth linkage block has a first top end and a second top end, said first top end leans against a limiting rod;

a fifth linkage block axially connected in said shell, wherein said fifth linkage block leans against said first top end and has a circuit breaking trigger end; and a rotating trigger block having a first leaning part and a pressing part, wherein said first leaning part leans against said fifth linkage block, said pressing part provides pressing actions if an external circuit breaking order is received.

8. The air circuit breaker, as recited in claim 6, further comprises a second restoring spring, wherein when said rotating trigger block is pressed, said fifth linkage block is detached from said rotating trigger block, said second restoring spring is utilized in such a manner that said fifth linkage block rotates along an axle.

9. The air circuit breaker, as recited in claim 7, further comprises a second restoring spring, wherein when said rotating trigger block is pressed, said fifth linkage block is detached from said rotating trigger block, said second restoring spring is utilized in such a manner that said fifth linkage block rotates along an axle.

10. The air circuit breaker, as recited in claim 1, wherein said input unit comprises a keyboard.

11. The air circuit breaker, as recited in claim 1, wherein said authentication processing unit is a microprocessor.

12. The air circuit breaker, as recited in claim 6, wherein said locking unit comprises:

a first linkage element rotating along an axle;

a first linkage rod, wherein a first end thereof is connected to a second end of said first linkage element;

a rotating axle driven to rotate by said second end of said first linkage element;

a trigger part casing on said rotating axle and corresponding to said pressing part of said rotating trigger block, wherein said air circuit breaker body is opened by pressing said pressing part;

an electromagnet, wherein an armature end thereof is corresponding to a first end of said first linkage element; and an action control circuit for receiving said control signal in such a manner that an electrifying state of windings of said electromagnet is controlled.

13. The air circuit breaker, as recited in claim 7, wherein said locking unit comprises:

a first linkage element rotating along an axle;

a first linkage rod, wherein a first end thereof is connected to a second end of said first linkage element;

a rotating axle driven to rotate by said second end of said first linkage element;

a trigger part casing on said rotating axle and corresponding to said pressing part of said rotating trigger block, wherein said air circuit breaker body is opened by pressing said pressing part;

an electromagnet, wherein an armature end thereof is corresponding to a first end of said first linkage element; and an action control circuit for receiving said control signal in such a manner that an electrifying state of windings of said electromagnet is controlled.

14. The air circuit breaker, as recited in claim 12, wherein said action control circuit comprises:

a fourth triode and a seventh triode respectively connected to two output ends of said microprocessor;

an eighth triode, wherein a base thereof is connected to a collector of said fourth triode;

a sixth triode, wherein a base thereof is connected to an emitter of said fourth triode;

a fifth triode, wherein a base thereof is connected to an emitter of said seventh triode, an emitter of said sixth triode is connected to an emitter of said fifth triode, and a collector of said fifth triode is connected to an emitter of said eighth triode;

a ninth triode, wherein a emitter thereof is connected to a collector of said sixth triode; and a collector of said ninth triode is connected to a collector of said eighth triode;

a ninth diode provided between a base of said fourth triode and said emitter of said sixth triode; and a twelfth diode provided a base of said seventh triode and said emitter of said fifth triode;

wherein an input end and an output end of said windings of said electromagnet are respectively provide between said emitter of said fifth triode and said emitter of said sixth triode.

15. The air circuit breaker, as recited in claim 13, wherein said action control circuit comprises:

a fourth triode and a seventh triode respectively connected to two output ends of said microprocessor;

an eighth triode, wherein a base thereof is connected to a collector of said fourth triode;

a sixth triode, wherein a base thereof is connected to an emitter of said fourth triode;

a fifth triode, wherein a base thereof is connected to an emitter of said seventh triode, an emitter of said sixth triode is connected to an emitter of said fifth triode, and a collector of said fifth triode is connected to an emitter of said eighth triode;

a ninth triode, wherein a emitter thereof is connected to a collector of said sixth triode; and a collector of said ninth triode is connected to a collector of said eighth triode;

a ninth diode provided between a base of said fourth triode and said emitter of said sixth triode; and a twelfth diode provided a base of said seventh triode and said emitter of said fifth triode;

wherein an input end and an output end of said windings of said electromagnet are respectively provide between said emitter of said fifth triode and said emitter of said sixth triode.

16. The air circuit breaker, as recited in claim 12, wherein a secondary self-locking mechanism comprises:

a loop mounted on said rotating axle, wherein a self-locking slot is provided on an inner wall of said loop;

a self-locking shell having a gap; and a self-locking block, wherein a third restoring spring is provided therein, said self-locking block has a self-locking end leaning against said inner wall of said loop.

17. The air circuit breaker, as recited in claim 13, wherein a secondary self-locking mechanism comprises:

a loop mounted on said rotating axle, wherein a self-locking slot is provided on an inner wall of said loop;

a self-locking shell having a gap; and a self-locking block, wherein a third restoring spring is provided therein, said self-locking block has a self-locking end leaning against said inner wall of said loop.

18. The air circuit breaker, as recited in claim 3, wherein said input part is a handle and/or a motor.

19. The air circuit breaker, as recited in claim 10, wherein said input unit further comprises a wireless transceiver circuit and a remote controller, said wireless transceiver circuit is connected to said authentication processing unit for receiving a code inputted by said remote controller by a wireless method.

* * * * *